June 30, 1959     J. A. MILLER     2,892,361
TRANSMISSION
Filed March 1, 1956                         2 Sheets-Sheet 1
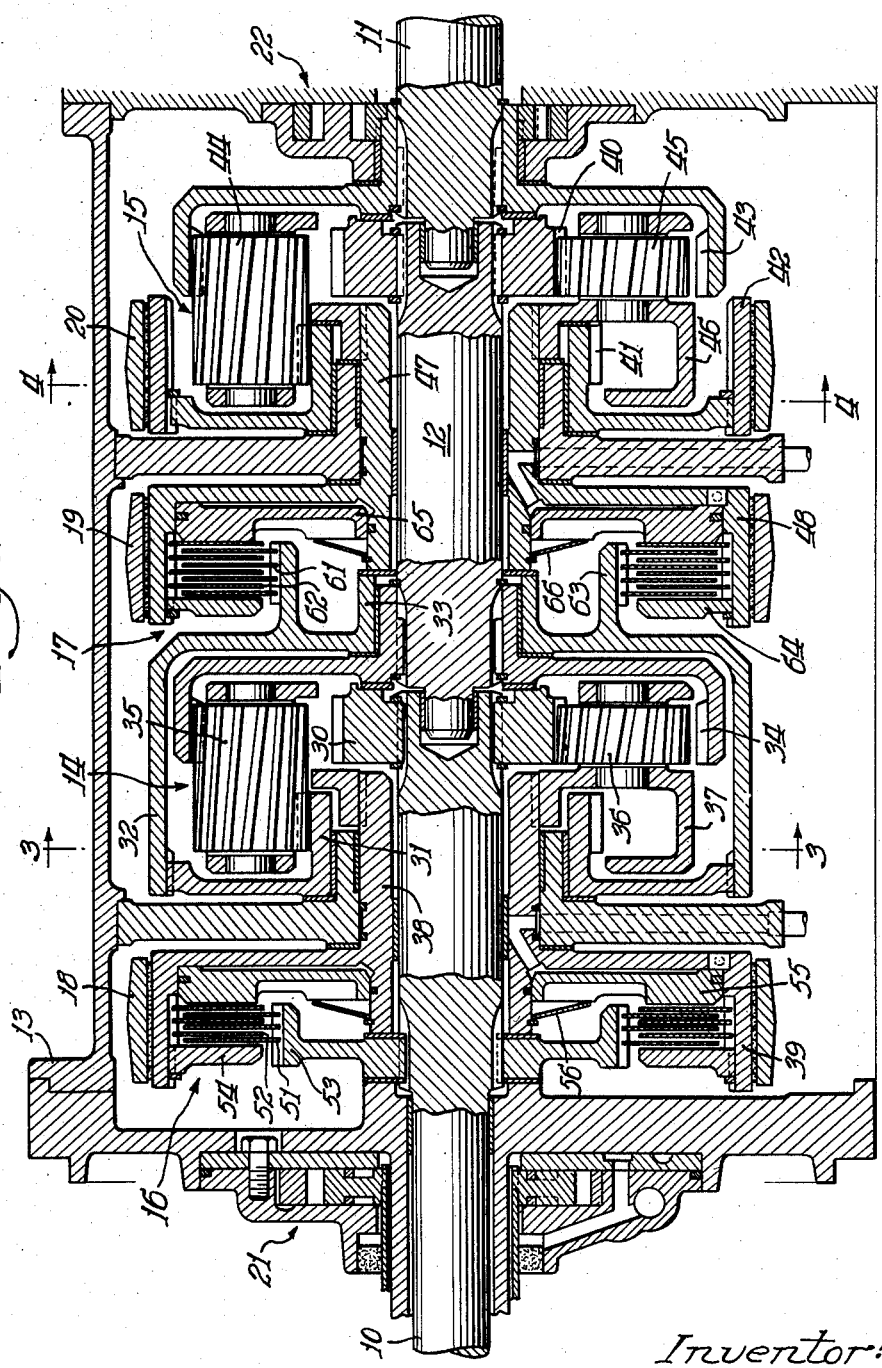
Inventor:
James A. Miller
By: Donald W. Banner   Atty.

June 30, 1959
J. A. MILLER
2,892,361
TRANSMISSION
Filed March 1, 1956
2 Sheets-Sheet 2
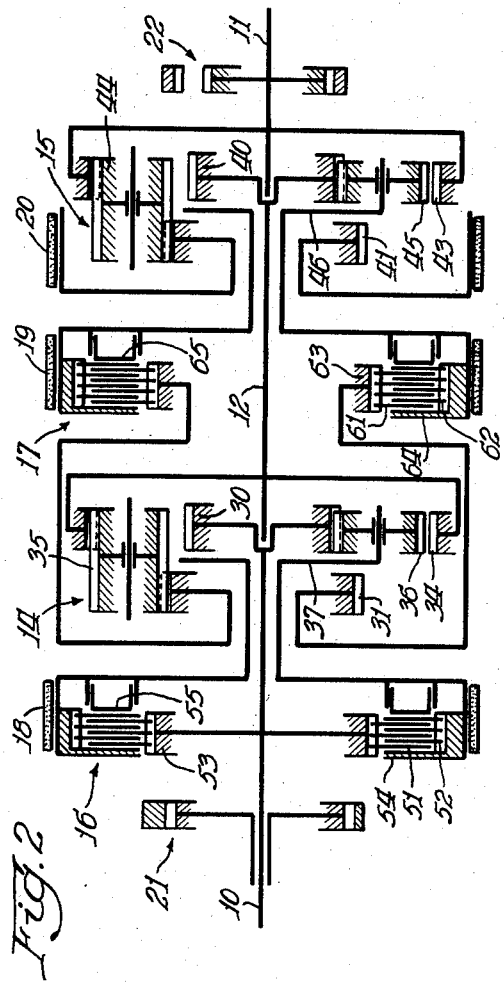
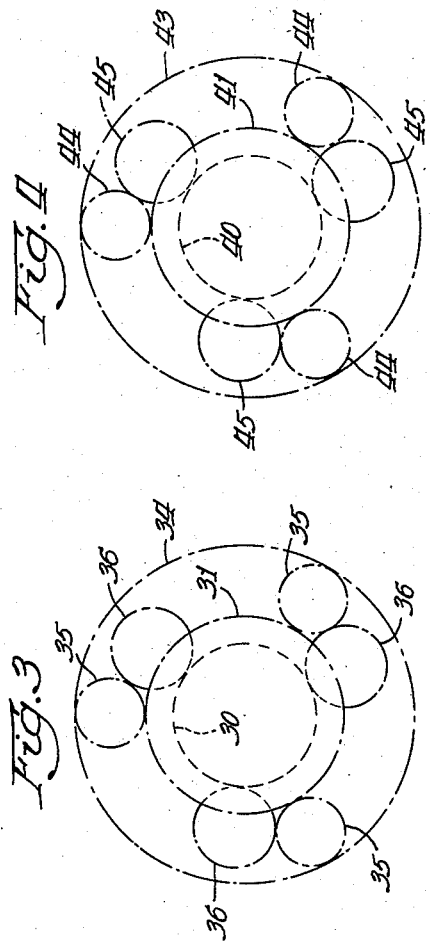
Inventor:
James A. Miller
By: Donald W. Banner, Atty.

United States Patent Office 2,892,361
Patented June 30, 1959

2,892,361

TRANSMISSION

James A. Miller, Jackson, Mich., assignor to Borg-Warner Corporation, a corporation of Michigan Application March 1, 1956, Serial No. 568,869

10 Claims. (Cl. 74—682)

The present invention relates to transmissions, and more particularly to transmissions particularly suitable for heavy duty vehicles or the like.

It is an object of the invention to provide an improved transmission having five speeds in forward drive and one speed in reverse drive, all speeds being completed by engagement of friction engaging mechanisms so that changing of speed ratios is accomplished without interruption of torque from the driving engine of the vehicle.

It is another object of the present invention to provide an improved transmission arranged to have only two multiple disc friction clutches and three friction brakes of the band variety effective to complete five different speed ratios in forward drive and one speed ratio in reverse drive.

Another object of the present invention is the provision of an improved transmission in accordance with the preceding objects which comprises a pair of identical, tandem-arranged planetary gear sets each of which comprises a plurality of sun and planetary gears and a ring gear, one of the sun gears serving as an input member while the ring gear serves as the output member.

Other objects and features of the invention will be readily apparent to those skilled in the art from the specification and appended drawings illustrating certain preferred embodiments in which:

Figure 1 is a longitudinal view partially in section of a transmission embodying the principles of the present invention;

Figure 2 is a schematic diagram of the transmission shown in Figure 1;

Figure 3 is a schematic diagram of one of the planetary gear sets employed taken generally along the plane of line 3—3 of Figure 1;

Figure 4 is a schematic diagram of the other of the planetary gear sets employed taken generally along the plane of line 4—4 of Figure 1;

Figure 5 is a tabular representation showing the various friction engaging mechanisms engaged to complete the various speed ratios through the transmission.

Like characters of reference designate like parts in the several views.

Referring to the drawings, illustrating one preferred embodiment of the present invention, there is disclosed a drive shaft 10, a driven shaft 11, and an intermediate shaft 12 axially aligned with and disposed between the drive and driven shafts. The drive shaft 10 is adapted for connection to the output member of a conventional torque converter, fluid coupling or like mechanism (not shown), and shaft 11 is adapted for connection to the driving road wheels of the vehicle by conventional suitable means. The shafts 10, 11 and 12 are all preferably journalled within a transmission casing 13. The transmission further comprises two "dual pinion type" planetary gear sets respectively indicated in general by the numerals 14 and 15, two multiple disc friction clutches respectively indicated in general by the numerals 16 and 17, and three band-type friction brakes numbered 18, 19, and 20 respectively.

The transmission preferably incorporates front and rear oil pumps 21 and 22, respectively, of conventional nature to pressurize and feed oil to the torque converter, or fluid coupling, to provide fluid pressure for engaging the friction clutches and the friction brakes and to provide lubrication for the entire transmission and any necessary cooling oil for the friction brakes and clutches.

The planetary gear set 14 comprises a main sun gear 30 fixedly mounted to the shaft 10; an auxiliary sun gear 31 carried by an extension 32 of a sleeve 33 rotatably disposed about the shaft 12; a ring gear 34 fixedly connected to one end of the shaft 12; a plurality of elongated planet or pinion gears 35 respectively in mesh with the sun gear 31 and the ring gear 34; a plurality of short planet or pinion gears 36 respectively in mesh with the sun gear 30 and one of the pinions 35; and a planet carrier 37 which is connected to a sleeve 38 rotatably disposed about the shaft 10, the carrier 37 rotatably supporting the pinion gears 35 and 36. Sleeve 38 is provided with an integral extension forming an annular brake drum 39, adapted to be engaged and held by friction band-type brake 18.

The planetary gear set 15 comprises a main sun gear 40 fixedly attached to the shaft 12; an auxiliary sun gear 41 connected to an annular brake drum 42 adapted to be engaged and held by the friction band-type brake 20; a ring gear 43 fixedly connected to the driven shaft 11; a plurality of elongated planet or pinion gears 44 respectively in mesh with the sun gear 41 and the ring gear 43; a plurality of short planet or pinion gears 45 respectively in mesh with the sun gear 40 and one of the pinion gears 44; and a planet gear carrier 46 upon which the planet gears 44 and 45 are rotatably mounted. The carrier 46 is connected to a sleeve 47 rotatably mounted about the shaft 12, and sleeve 47 is connected to an annular brake drum 48 adapted to be engaged and held by the friction band-type brake 19.

Friction clutch 16 is of conventional type and is arranged to connect the shaft 10 and the carrier 37 of the planetary gear set 14 and comprises a plurality of interleaved clutch plates 51 and 52 respectively splined to a drum 53 carried by shaft 10 and the brake drum 39. The clutch plates 51 and 52 are disposed between an annular backing plate 54 mounted to the brake drums 39 by a splined connection and an annular piston 55 longitudinally movable in a suitable cavity provided in the associated brake drum member so that upon application of fluid pressure to the piston 55, the clutch plates 51 and 52 are frictionally engaged. Suitable, conventional spring means 56 may be provided to bias the piston to the clutch-disengaged position.

The friction clutch 17 is similar to the clutch 16 and is arranged to effect the connection between the auxiliary sun gear 31 of the planetary gear set 14 and the planet carrier 46 of the planetary gear set 15. Clutch 17 comprises a plurality of interleaved clutch plates 61 and 62 respectively splined to a drum 63 (connected to sun gear 31 through extension 32) and to the brake drum 48. The plates 61 and 62 are disposed between an annular backing plate 64, splined to brake drum 48, and an annular piston 65 longitudinally movable in a suitable housing provided in the associated brake drum member upon the application of fluid pressure thereto to effect frictional engagement of the clutch plates 61 and 62. Suitable spring means 66 may be provided to bias the piston 65 to the clutch-disengaged position, as will be well understood by those skilled in the art. As previously described, the friction clutch 17 is similar to the clutch 16 and is of conventional nature.

The transmission of the present invention is particularly adapted for heavy duty use and has a neutral condition, five forward drive speed ratios and one reverse drive speed ratio. The transmission may be operated automatically or manually. When operated automatically, the transmission may be controlled by effecting the automatic application and operation of the clutches 16 and 17 and the brakes 18, 19 and 20 by the application of hydraulic pressures controlled by any suitable control mechanism, as will be readily understood by those skilled in the art.

In the neutral condition, none of the friction brakes 18, 19 or 20, and neither of the clutches 16 or 17 are engaged. In this condition, when the vehicle engine is operated, torque will be transmitted (through the fluid coupling or torque converter employed) to the shaft 10 which will effect rotation of the sun gear 30 of the planetary gear set 14. There is no torque output transmitted to the driven shaft 11 since there are no reaction elements in either the gear set 14 or the gear set 15. If desired, a power take-off unit may be mounted to the shaft 10, and this may be utilized in the neutral condition of the transmission if desired so as to be driven by shaft 10 when no torque is being transmitted to driven shaft 11; obviously such a unit could also be used when shaft 11 is being rotated.

Each of the two planetary units provides a major reduction when the planet carrier is held and a minor reduction when the reaction sun gear is held. As will be apparent from the consideration of Figure 5, in the first forward speed ratio both of the planetary units 14 and 15 are in major reduction inasmuch as the friction brakes 18 and 19 are applied which respectively hold the planet carrier 37 and 46. The friction brake 20 and the clutches 16 and 17 are not engaged. Rotation of the shaft 10 then effects rotation of the sun gear 30 and the drive follows through the planetary gears 36, planetary gears 35, ring gear 34, shaft 12, sun gear 40, planet gears 45 and 44, and ring gear 43 to the driven shaft 11.

The drive in second speed forward ratio is obtained by disengaging brake 18 and engaging clutch 17 while retaining the brake 19 in its engaged condition. Clutch 16 is disengaged and brakes 18 and 20 are inoperative. In this condition of the transmission the planetary gear set 14 is in minor reduction while the planetary gear set 15 remains in major reduction. This is effected by virtue of the engagement of the clutch 17 which is effective to connect the auxiliary sun gear 31 of the front planet gear set 14 to the carrier 46 of the rear planet gear set 15, both the sun gear 31 and the carrier 46 being held stationary by the applied brake 19 so as to be reaction elements. The drive is then from the shaft 10 through the sun gear 30, the planetary pinion 36 and 35, ring gear 34, shaft 12, sun gear 40, planetary pinions 45 and 44, and ring gear 43 to driven shaft 11.

In the third forward speed ratio, brake 19 remains engaged and clutch 16 is engaged; clutch 17 is disengaged and brakes 18 and 20 are inoperative. When this condition obtains it will be seen that the front planetary gear set 14 is "locked up" to rotate as a unit inasmuch as clutch 16 has effectively connected together the sun gear 30 and the planet carrier 37 so that both of these elements rotate with the shaft 10; in the rear planetary gear set 15, the carrier 46 is still held by the brake 19 so that the gear set 15 remains in major reduction.

In the fourth forward speed ratio the clutch 16 remains engaged, and the brake 20 is engaged; clutch 17 and brakes 18 and 19 are inoperative. It will therefore be seen that the front planetary gear set 14 remains "locked up" and rotates as a unit with the shaft 10, while the rear planetary gear set 15 is in minor reduction, brake 20 holding the auxiliary sun gear 41 which acts as the reaction element.

In the fifth forward speed none of the brakes 18, 19 or 20 are engaged, but the clutches 16 and 17 are both engaged. It will be apparent to those skilled in the art that in this condition both of the planetary gear sets 14 and 15 are "locked up" and rotate together as a unit. The gear set 14 has two output members and the gear set 15 correspondingly has two input members. More specifically, in this condition the auxiliary sun gear 31 introduces torque into the planetary gear set 15 by virtue of its connection through the clutch 17 to the carrier 46 of the gear set 15; the remainder of the power flows from gear set 14 through the ring gear 34 thereof and shaft 12 into the sun gear 40 of the gear set 15.

To obtain reverse drive through the transmission of the present invention, the clutch 17 is engaged and the brake 18 is applied; clutch 16 and brakes 19 and 20 are inoperative. This permits the reaction of the planetary gear set 14 to be taken by the friction brake 18 which holds the carrier 37 stationary. Sun gear 31 and ring gear 34 respectively transmit torque to carrier 46 and sun gear 40.

As previously described, a power take-off gear may be connected to the shaft 10 for driving any selected instrumentality whether or not the vehicle is being driven through the transmission. This power take-off unit may comprise a gear rotated by the shaft 10 and adapted for engagement with a slidable gear movable into and out of engagement therewith in conventional manner.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

I claim:

1. In a transmission, the combination comprising a drive shaft, a driven shaft, and first and second planetary gear sets constructed and arranged to transmit torque therebetween; said first planetary gear set comprising a first sun gear element, a second sun gear element, a ring gear element, a first planet gear in mesh with one of said sun gear elements and said ring gear element, a second planet gear in mesh with the other of said sun gear elements and said first planet gear, and a carrier element for said first and second planet gears; said second planetary gear set comprising a third sun gear element, a fourth sun gear element, a second ring gear element connected to said driven shaft, a third planet gear in mesh with said second ring gear element and with one of said two last-mentioned sun gear elements, a fourth planet gear in mesh with the other of said last-mentioned sun gear elements and said third planet gear, and a second carrier element for said third and fourth planet gears, certain of the constituent elements of said second planetary gear set forming a pair of input elements; said first sun gear element of said first gear set constituting an input element driven directly by said drive shaft and said first gear set being so constructed and arranged that two of the constituent elements including said first-mentioned ring gear element constitute output elements which are adapted for respective connection to said two input elements of said second planetary gear set, and friction means associated with said planetary gear sets constructed and arranged to be selectively engageable to complete five forward speed ratios and a reverse drive through said transmission.

2. In a transmission, the combination comprising a drive shaft, a driven shaft, and first and second planetary gear sets constructed and arranged to transmit torque therebetween; said first planetary gear set comprising a first sun gear element, a second sun gear element, a ring gear element, a first planet gear in mesh with one of said sun gear elements and said ring gear element, a second planet gear in mesh with the other of said sun gear elements and said first planet gear, and a carrier element for said first and second planet gears; said second planetary gear set comprising a third sun gear element, a fourth sun gear element, a second ring gear element connected to said driven shaft, a third planet gear in mesh with said second ring gear element and with one of said two last-mentioned sun gear elements, a fourth planet gear in mesh with the other of said last-mentioned sun gear elements and said third planet gear, and a second carrier element for said third and fourth planet gears, certain of the constituent elements of said second planetary gear set comprising input elements; said first sun gear element constituting an input element driven directly by said drive shaft and said first gear set being so constructed and arranged that two of the constituent elements including said first-mentioned ring gear element constitute output elements which are adapted for respective connection to said two input elements of said second planetary gear set, and friction means associated with said planetary gear sets constructed and arranged to be selectively engageable to complete five forward speed ratios and a reverse drive through said transmission, said friction means comprising a friction clutch engageable to lock up said first planetary gear set to effect a relatively high forward speed ratio between said shafts and constructed and arranged to effect direct connection of said first mentioned carrier element to said drive shaft whereby said first-mentioned carrier element and said first sun gear element rotate together.

3. In a transmission, the combination comprising a drive shaft, a driven shaft, and first and second planetary gear sets constructed and arranged to transmit torque therebetween; said first planetary gear set comprising a first sun gear element, a second sun gear element, a ring gear element, a first planet gear in mesh with one of said sun gear elements and said ring gear element, a second planet gear in mesh with the other of said sun gear elements and said first planet gear, and a carrier element for said first and second planet gears; said second planetary gear set comprising a third sun gear element, a fourth sun gear element, a second ring gear element connected to said driven shaft, a third planet gear in mesh with said second ring gear element and with one of said two last-mentioned sun gear elements, a fourth planet gear in mesh with the other of said last-mentioned sun gear elements and said third planet gear, and a second carrier element for said third and fourth planet gears, certain of the constituent elements of sai dsecond planetary gear set forming input elements; said first sun gear element constituting an input element driven directly by said drive shaft and said first gear set being so constructed and arranged that two of the constituent elements including said first-mentioned ring gear element constitute output elements including said first-mentioned ring gear element which are adapted for respective connection to said two input elements of said second planetary gear set, and friction means associated with said planetary gear sets constructed and arranged to be selectively engageable to complete five forward speed ratios and a reverse drive through said transmission, and in which said friction means comprises a second friction clutch engageable to connect said second sun gear element to said second carrier element and operable with said first friction clutch to complete the highest forward speed ratio through the transmission.

4. In a transmission, the combination comprising a drive shaft, a driven shaft, and first and second planetary gear sets constructed and arranged to transmit torque therebetween; said first planetary gear set comprising a first sun gear element, a second sun gear element, a ring gear element, a first planet gear in mesh with one of said sun gear elements and said ring gear element, a second planet gear in mesh with the other of said sun gear elements and said first planet gear, and a carrier element for said first and second planet gears; said second planetary gear set comprising a third sun gear element, a fourth sun gear element, a second ring gear element connected to said driven shaft, a third planet gear in mesh with said second ring gear element and with one of said two last-mentioned sun gear elements, a fourth planet gear in mesh with the other of said last-mentioned sun gear element and said third planet gear, and a second carrier element for said third and fourth planet gears, certain of the constituent elements of said second planetary gear set forming input elements; said first sun gear element constituting an input element driven directly by said drive shaft and said first gear set being so constructed and arranged that two of the constituent elements including said first-mentioned ring gear element constitute output elements which are adapted for respective connection to said two input elements of said second planetary gear set, and friction means associated with said planetary gear sets constructed and arranged to be selectively engageable to complete five forward speed ratios and a reverse drive through said transmission, said friction means comprising a first friction clutch constructed and arranged to connect one of said sun gear elements of said first planetary gear set to said second carrier element and friction brake means operable when said first friction clutch is engaged to effect an intermediate forward speed drive through the transmission.

5. The device defined in claim 4 in which said friction means comprises a second friction clutch engageable to effect a higher intermediate forward speed drive through the transmission when said friction brake is engaged and said first friction clutch is disengaged and constructed and arranged to connect said first carrier element and said first sun gear element.

6. The device defined in claim 5 in which said friction means comprises an additional friction brake adapted to hold one of said two last-mentioned gun gear elements to effect a highest intermediate forward speed drive through the transmission when said second friction clutch only is engaged.

7. In a transmission, the combination comprising a drive shaft, a driven shaft, and first and second planetary gear sets constructed and arranged to transmit torque therebetween; said first planetary gear set comprising a first sun gear element, a second sun gear element, a ring gear element, a first planet gear in mesh with one of said sun gear elements and said ring gear element, a second planet gear in mesh with the other of said sun gear elements and said first planet gear, and a carrier element for said first and second planet gears; said second planetary gear set comprising a third sun gear element, a fourth sun gear element, a second ring gear element connected to said driven shaft, a third planet gear in mesh with said second ring gear element and with one of said two last-mentioned sun gear elements, a fourth planet gear in mesh with the other of said last-mentioned sun gear elements and said third planet gear, and a second carrier element for said third and fourth planet gears, certain of the constituent elements of said second planetary gear set including said third sun gear constituting input elements; said first sun gear element constituting an input element driven directly by said drive shaft and said first gear set being so constructed and arranged that two of the constituent elements including said first-mentioned ring gear element constitute output elements, means fixedly connecting said first-mentioned ring gear element and said third sun gear element, means fixedly mounting said second ring gear element to said driven shaft, and friction means associated with said planetary gear sets constructed and arranged to be selectively engageable to complete five forward speed ratio and a reverse drive through the transmission.

8. The device defined in claim 7 in which said friction means comprises a friction brake constructed and arranged to prevent rotation of said first-mentioned carrier element to provide a low speed drive through said first planetary gear set.

9. The device defined in claim 7 in which said friction means comprises a friction brake constructed and arranged to prevent rotation of said first-mentioned carrier element to provide a low speed drive through said first planetary gear set, and a second friction brake constructed and arranged to prevent rotation of said second carrier element to provide a low speed drive through said second planetary gear set and operable with said first friction brake to provide the lowest forward speed drive between said drive and driven shafts.

10. The device defined in claim 7 in which said friction means comprises a friction clutch engageable to connect said second sun gear element to said second carrier and a friction brake effective to prevent rotation of said first-mentioned carrier element and operable with said friction clutch to provide a reverse drive through said transmission.

References Cited in the file of this patent
UNITED STATES PATENTS 2,631,476  Ravigneaux _____ Mar. 17, 1953